(12) United States Patent
Rust et al.

(10) Patent No.: US 6,622,285 B1
(45) Date of Patent: Sep. 16, 2003

(54) METHODS AND SYSTEMS FOR FAULT LOCATION

(75) Inventors: Robert A. Rust, Boise, ID (US); Barry J Oldfield, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 531 days.

(21) Appl. No.: 09/706,315

(22) Filed: Nov. 2, 2000

(51) Int. Cl.[7] .................................. G06F 11/00
(52) U.S. Cl. ........................ 714/811; 714/799
(58) Field of Search ..................... 714/811, 799, 714/2

(56) References Cited

U.S. PATENT DOCUMENTS

| | | | |
|---|---|---|---|
| 6,012,148 A | * | 1/2000 | Laberge et al. ............... 714/2 |
| 6,567,891 B2 | * | 5/2003 | Oldfield et al. ............. 711/114 |
| 6,574,709 B1 | * | 6/2003 | Skazinski et al. ........... 711/119 |

* cited by examiner

Primary Examiner—Phung M. Chung

(57) ABSTRACT

Methods and systems for fault location are described. In one described embodiment, an "in circuit" solution is provided for locating faults along a passive transmission line. Once a fault occurs, various hardware gathers information that is necessary to determine which of a number of different replaceable components has failed. This enables the subsystem to properly respond to the fault condition and thereby eliminate any guessing that could potentially lead to loss of data availability. In the particular described embodiment, signals are driven and received through a selected input/output (I/O) pad. Logic circuitry is provided and launches a wave onto the passive transmission line. Immediately following the launching of the wave, the I/O pad is monitored and can sense the reflections from the wave that has just been launched. By analyzing the reflections, and more specifically the time that it takes for the reflection to be sensed, a determination is made as to the fault location. Once the fault location (or distance thereto) is ascertained, a determination can be made as to which component has failed. At this point, an intelligent decision can be made as to which component should continue operation.

20 Claims, 4 Drawing Sheets

METHODS AND SYSTEMS FOR FAULT LOCATION

TECHNICAL FIELD

The present invention relates to fault location and, in particular, pertains to fault location in passive transmission lines that transmit data from one component to another.

BACKGROUND

In today's fault tolerant systems, a continuous passive transmission line can be used to transmit information or data from one component to another. When a fault occurs, e.g. when a component fails or when the transmission line fails in a particular location, the faulty component or transmission line must be replaced. Before the replacement occurs, however, the subsystem typically must respond to the fault condition, e.g. by implementing a remedial recovery process. In order to respond to the fault condition, the subsystem will likely be required to make assumptions about the nature and location of the fault. Many times, though, the nature and location of the fault cannot easily be ascertained, thereby complicating the assumption-formulating process undertaken by the subsystem. Assumptions that are incorrect can have adverse consequences. For example, some systems might experience a loss of data availability. Additionally, incorrect assumptions can cause the wrong components to be replaced thereby requiring extra time, effort and resources of those who are responsible for servicing such systems.

As an example, consider so-called high reliability computer disk storage systems. In high reliability computer disk storage systems, there is a desire to have redundancy in all of the physical parts that make up a subsystem to reduce the potential for loss of data and down time upon failure of a part or component. The use of dual disk storage controllers, each having its own memory, provides several major benefits to a disk storage system. For example, (1) a redundancy of storage information is retained to allow for recovery in the case of failure or loss of one controller or its memory; (2) recovery from a disabled controller is feasible due to the failover capabilities of the secondary controller; and (3) greater system up time is achieved through the secondary controller being available.

With the desire for more performance out of these redundant subsystems, caching and the use of memory as temporary storage has become commonplace. The means by which these duplicate physical memories are kept in synchronization can be difficult. Some disk systems use a latent (delayed or massive update) process to create this duplication, but that approach tends to degrade performance and is very complex to manage. Another approach is to form a real time mirrored memory process to create and accurately retain this duplication of data. The use of real time, synchronized, redundant memory (mirrored memory) in dual controllers can improve speed and accuracy in the case of a failover from one controller to the other.

However, this use of redundant memory makes the problem of providing multiple disk storage controller solutions substantially more difficult. Some of the problems that arise in these types of systems include how to effectively and reliably (1) detect controller failure early on in the context of mirrored memory processing so as to reduce potential problems that may occur from a later discovery of the failure; (2) detect controller failure without significant hardware and/or software overhead requirements; and (3) detect controller failure to separate the controllers and discontinue mirroring of their memories without loss of processing operations and capabilities.

In current AUTORAID subsystem implementations, a significant number of the signals that get passed between controllers are used for mirror traffic. If the interface between the controllers is faulty, the controller electronics can no longer support the mirroring function between the two boards that support the controllers. When the mirror function is not operating, then only one controller board can run in the system. The other controller board will not have access to the proper memory image, so it must discontinue operation.

FIG. 1 shows an exemplary dual controller system 10 that includes a controller A and a controller B. Each controller includes memory of some type (here illustrated as a DRAM) and a memory controller that is configured to manage and control the memory for each controller. As the "X" in the figure indicates, faults can occur in any one of three locations, i.e. on or in each of the controllers, or somewhere in the connecting mid-plane. The operation of exemplary dual controller disk storage systems is described in the following U.S. Patents, assigned to the assignee of this document and incorporated by reference herein: U.S. Pat. Nos. 5,928,367, 5,699,510, 5,553,230, and 5,856,989.

Given today's available technology, the hardware subsystem is not able to determine the exact location of a component that has failed. If the controllers decide to continue operation with controller A, and controller A is the one that has failed, then the state of the machine will advance on a component that must ultimately be replaced. The incorrect assumption or decision on the part of the subsystem will become apparent when service personnel first attempt a repair by replacing controller B. When this controller is replaced, the mirror interface will continue to be faulted since controller A has yet to be repaired. At this point, the service procedure will require that the subsystem be shut down and that all important information be stored on the disk drives. This shut down procedure will cause a loss of data availability. Controller A will then be replaced and the required information will be restored from the disk drives.

In a worst-case situation, even more availability to data is lost when the mid-plane (or medium that connects the two controllers) is faulty. In this case, the fault is still present in the system when the second controller is replaced. If both controllers are replaced and the problem persists, then the mid-plane can be assumed to be the faulty component. Again, the system must be shut down and the necessary data stored to disk drives. It would be far more desirable to know where the fault resides so that the proper action can be taken by the repair personnel at the start of the repair procedure.

Accordingly, this invention arose out of concerns associated With improving fault location in various systems, and particularly those systems that comprise mirrored memory dual controller disk storage systems.

SUMMARY

Methods and systems for fault location are described. In one described embodiment, an "in circuit" solution is provided for locating faults along a passive transmission line. Once a fault occurs, various hardware gathers information that is necessary to determine which of a number of different replaceable components has failed. This enables the subsystem to properly respond to the fault condition and thereby eliminate any guessing that could potentially lead to loss of data availability.

In the particular described embodiment, signals are driven and received through a selected input/output (I/O) pad. Logic circuitry is provided and launches a wave onto the passive transmission line. Immediately following the launching of the wave, the I/O pad is monitored and can sense the reflections from the wave that has just been launched. By analyzing the reflections, and more specifically the time that it takes for the reflection to be sensed, a determination is made as to the fault location. Once the fault location (or distance thereto) is ascertained, a determination can be made as to which component has failed. At this point, an intelligent decision can be made as to which component should continue operation.

In one embodiment, a fault-detection application specific integrated circuit (ASIC) is provided and comprises wave-generating circuit means configured to generate a wave that can be propagated along a transmission line along which information or data is transmitted. Reflection-sensing circuit means are configured to receive a wave that has been reflected because of a fault encountered by the generated wave and determine a propagation time associated with the reflected wave.

In another embodiment, a fault location system comprises multiple controllers that are configured to produce and transmit data. Connection media is provided and communicatively links the multiple controllers with one another. At least one wave propagator is configured to generate a wave that can be propagated along the connection media. At least one wave reflection sensor is configured to sense a propagated wave that has been reflected because of encountering a fault in its propagation path. At least one fault locator is configured to ascertain the location of a fault based upon the reflected wave that is sensed by the one wave reflection sensor.

In yet another embodiment, a fault location method comprises launching a wave along a transmission line that is configured to carry data. A reflected wave is received that is reflected by a fault that is encountered by the launched wave in its propagation path. An amount of time is determined that is associated with the time between launching the wave and receiving the reflected wave. From the amount of time, a location of the fault that was encountered by the launched wave is ascertained.

DETAILED DESCRIPTION

Overview

The embodiments described below comprise systems and methods for locating faults in a transmission system.

Although the example that is described in this document is in the context of mirrored memory redundant controller disk storage systems, it will be appreciated that the principles of the described embodiments have applicability outside of such specific systems. Accordingly, utility can be derived in various other systems in which fault recovery is or can be employed. Other exemplary systems can include, without limitation, clustered fault tolerant CPUs, and satellites that utilize redundant controller circuitry.

Figure 2:
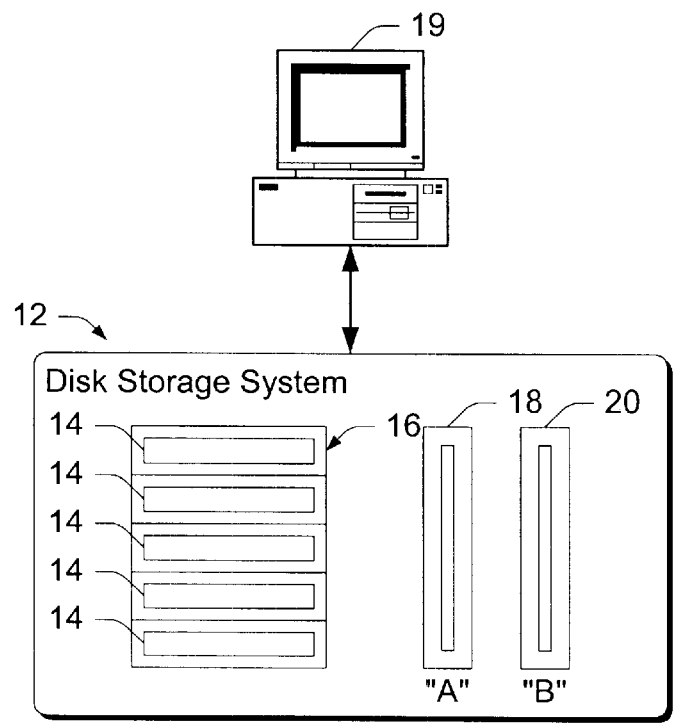
FIG. 2 is a block diagram that illustrates various components of an exemplary dual controller disk storage system.

FIG. 2 is a system diagram of an exemplary inventive redundant controller disk storage system 12 in the form of a dual controller disk storage system. Although a dual controller system is used for exemplary purposes, the methods and principles discussed herein can be employed in the context of other redundant controller systems that are not necessarily dual in nature. System 12 includes disk storage devices 14 that collectively comprises a disk drive array 16. A pair of disk storage controllers are shown and include disk storage controller 18 and disk storage controller 20. In the illustrated example, disk storage controller 18 is shown in a slot "A" and disk storage controller 20 is shown in a slot "B". The disk storage system 12 is configured to interface with a computer 19 and is shown as a separate component. It will be appreciated that the disk storage system 12 and computer 19 could be contained within a common enclosure.

Figure 3:
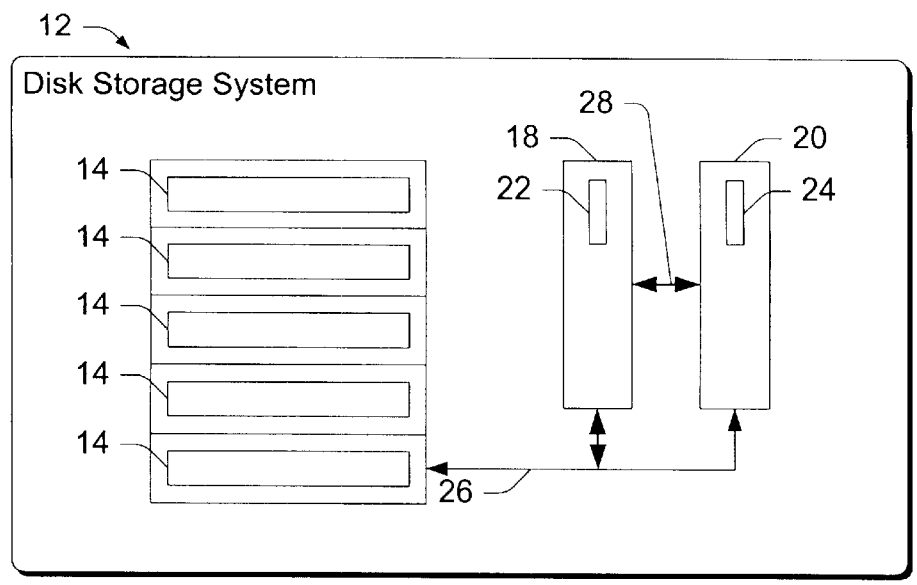
FIG. 3 is a block diagram of the FIG. 2 controllers that gives somewhat more detail than the FIG. 2 diagram.

FIG. 3 shows disk storage system 12 in somewhat more detail. Each of controllers 18, 20 include memory 22, 24 respectively. Although most any type of Random Access Memory (RAM) is suitable for use as memory 22, 24, in certain embodiments it is advantageous to use non-volatile RAM (or volatile RAM made non-volatile by use of a power supply backup) to allow for retention of data in the event of a power failure, controller failure, communications failure, or the like. Additionally, although only dual controllers 18, 20 are shown and discussed generally herein, it should be appreciated that the teachings expressed and implied herein are likewise applicable in a multiple controller environment where more than two controllers are used.

Each memory 22, 24 is a so-called mirrored memory which simply means that data in one memory is duplicated or "mirrored" in another memory. Accordingly, having mirrored memory in the controllers means that data in the memory of one controller is duplicated or "mirrored" in the memory of the other controller. In the described embodiment, the mirrored memory can be a real-time mirrored memory, i.e., a single microprocessor or direct memory access updates data into or retrieves data from both memories 22, 24 substantially concurrently. The existence of dual controllers, and mirrored memory in each, provides a fault tolerant environment for disk storage system 12.

Disk controllers 18, 20 includes control logic (not specifically designated) that, among other functions, controls the mirroring process, maintains low level mirroring accuracy, and low level failure detection of the mirroring process. Data flow between controllers 18, 20 and disk array 16 takes place via a disk assembly backplane 26. Data flow between controllers 18, 20 takes place via a backplane 28. Other media can, of course, be utilized.

For purposes of this document, the reader is assumed to have some familiarity with mirrored memory dual controller disk storage systems and its operation. For additional information, the reader is referred to the patents that were incorporated by reference above.

Exemplary Method

Figure 4:
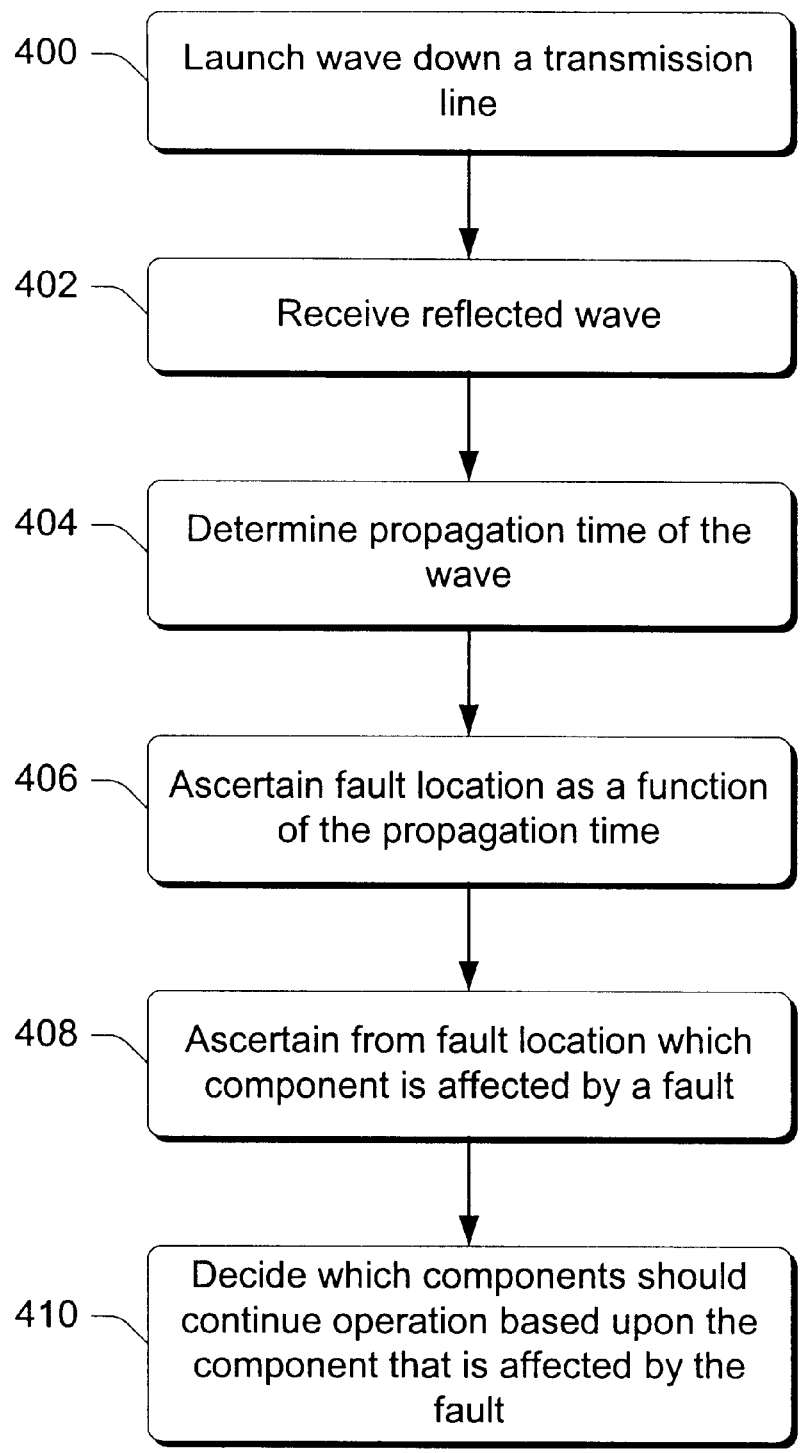
FIG. 4 is a flow diagram that describes steps in a method in accordance with the described embodiment.

FIG. 4 shows a flow diagram that describes steps in a fault location method in accordance with the described embodiment. The steps that are described in FIG. 4 can be implemented in any suitable hardware, software, firmware, or combination thereof. In a particular advantageous embodiment, the steps are implemented by an Application Specific Integrated Circuit (ASIC) that can be incorporated into each of the controllers in a dual controller system. In some embodiments, the functionality about to be described can be implemented as part of a normal data path ASIC that comprises the dual controller system. A data path ASIC is one that is responsible for movement of data or communication between and among ICs.

Step 400 launches a wave down a transmission line. In the described embodiment, the transmission line constitutes the medium that connects the two controllers together so that the controllers can exchange information and data. The term "wave" is intended to mean, without limitation, any suitable signal or entity that is capable of being rendered onto the transmission line and propagated therealong in a manner such that it is capable of being reflected along the transmission line. As the wave propagates along the transmission line and encounters a discontinuity that is caused by a fault condition, e.g. a short or open condition, the wave will be reflected back along the transmission line. Accordingly, step 402 receives the reflected wave. Step 404 determines the propagation time of the wave that was rendered onto the transmission line. Specifically, the term "propagation time" is understood to mean that time that elapsed between when the wave was placed onto the transmission line and when the reflected wave was received back. Once the propagation time has been determined, step 406 ascertains a fault location as a function of the propagation time. Specifically, it has been discovered that the amount of time that it takes for a wave to propagate along a transmission line so that it is reflected and received back at its point of origin can be correlated with the location of, or distance to a particular fault. For example, assuming that standard materials are utilized in connection with printed circuit boards, a wave will generally propagate around 6-inches every nanosecond. Thus, if a wave takes two nanoseconds to be reflected, it can be assumed that the wave took one nanosecond to reach the fault and one nanosecond to return to its point of origin. From this, it can be determined that a fault exists roughly 6-inches away from the wave's point of origin.

Once the location of a particular fault has been ascertained, step 408 ascertains from the fault location which component is affected by the fault. For example, the components that can be affected by the fault can be either of the controllers or the transmission line. Once a particular component has been identified as being affected by the fault, step 410 decides which components should continue operation based upon the component that is affected by the fault.

Figure 1:
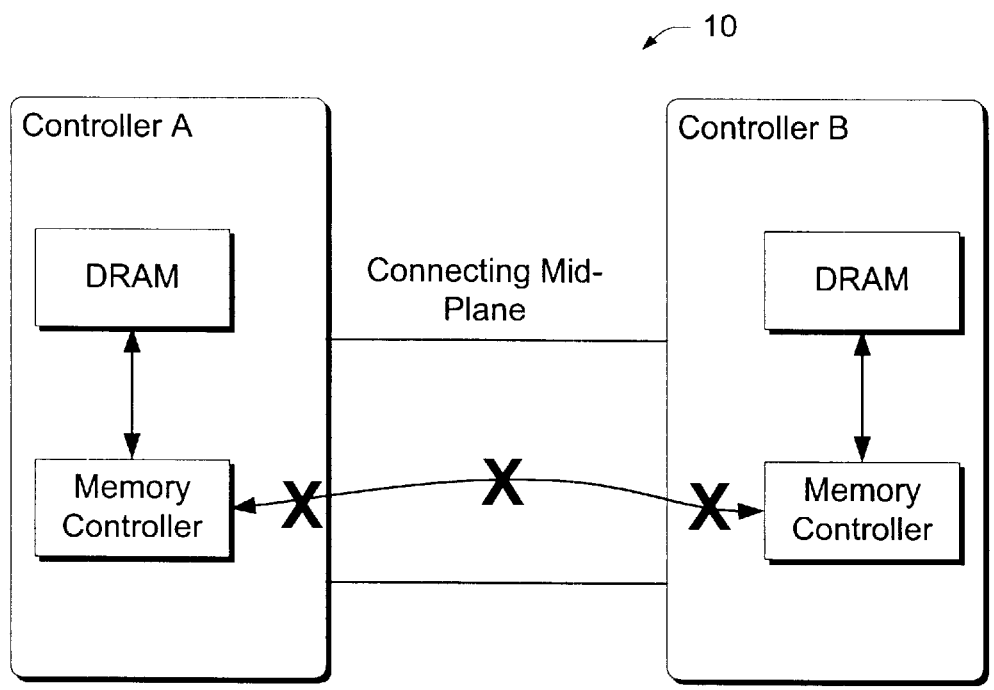
FIG. 1 is a high level diagram of a dual controller system that is helpful in understanding problems associated with current systems.

As an example, consider the following in connection with FIG. 1. Assume that a fault occurs at controller B. At the instant of failure, certain decisions must be made so that operation can continue. If, for example, the wrong controller is selected for continued operation, then the state will be advanced on the faulty controller. If the state is advanced on a faulty controller, then the state will have to be recovered at some point. This is an undesirable situation. In the past, there was no way of ascertaining with any degree of certainty where the fault occurred. All that service personnel might know is that a fault did occur. Typically, service personnel might not be in a position to repair a fault until some hours after its occurrence. Due to the nature of these past systems (i.e. not being able to ascertain which controller is faulted with a desirable degree of certainty), the service personnel might swap out (incorrectly) controller A mistakenly believing that it was the source of the fault. Once system operation resumed and the fault had not abated, they might conclude that controller B was the source of the fault. Accordingly, they would then swap out controller B for a new controller. All the while during this process, the system has been shut down and data has been unavailable for use. In the described embodiment, when a fault occurs with controller B, a fault location sub-system executing on controller A might propagate a wave down the transmission line toward controller B. When the wave reaches the fault at controller B, it would be reflected back toward controller A. When the fault location sub-system receives the reflected wave, it is able to ascertain from the propagation time where the fault location, and hence faulty component is located. With this information, the system can now make intelligent decisions that affect continued operation. Specifically, if the system now knows that controller B is faulty, then operation can be shifted to controller A and controller B can be effectively locked out. This prevents any operational mishaps that could result from continued use of a faulty controller. It will be appreciated that if the fault location sub-system on controller B were utilized to ascertain the location of the fault, the result would be the same, i.e. controller B would be identified as the faulty controller based upon the propagation time of the wave that was rendered onto the transmission line.

Exemplary Fault Detector/Locator

Figure 5:
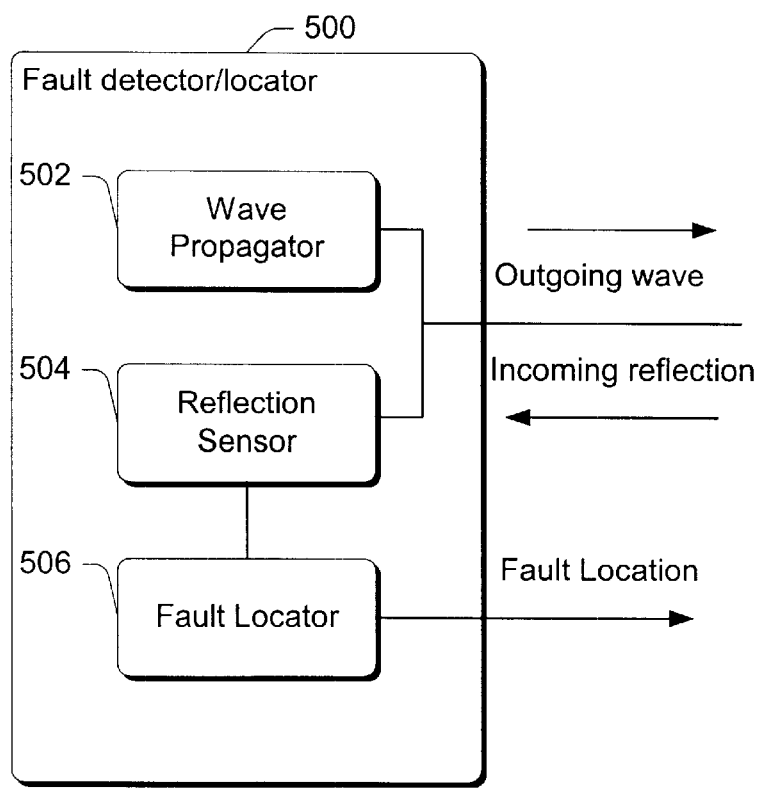
FIG. 5 is a block diagram of an exemplary fault detector/locator in accordance with the described embodiment.

FIG. 5 shows an exemplary fault detector/locator generally at 500. The fault detector/locator can be implemented in any suitable hardware, software, firmware or combination thereof. In the illustrated example, the fault detector/locator 500 includes three modules or elements-a wave propagator 502, a reflection sensor 504, and a fault locator 506. Although these modules or elements are shown are being separate, they could be easily integrated into a single module or element. Wave propagator 502 is desirably configured to develop a wave that can be propagated along a connection medium such as a transmission line that connects two controllers in a mirrored memory dual controller disk storage system. Any suitable wave propagator can be used. Reflection sensor 504 is configured to sense a wave that has been reflected by a fault in the system. Specifically, when wave propagator 502 generates a wave and renders the wave onto the transmission line, the wave will continue until it encounters a condition that is caused by a fault. At this point the wave will be reflected back toward the fault detector/locator 500. Reflection sensor 504 desirably senses this reflection and can ascertain the time that it took for the propagated wave to be reflected back to the fault detector/locator 500. Any suitable reflection sensor can be used. When the reflection sensor 504 has ascertained a propagation time, fault locator 506 uses the propagation time to locate the fault and ascertain from the fault location which particular component or components is (are) affected by the fault. Any suitable fault locator can be used.

The above-described fault detector/locator can be utilized in any system in which it is desirable to locate and act upon a fault. In a particularly useful embodiment, the fault detector/locator is incorporated into multiple different controllers that are utilized in mirrored memory redundant controller (e.g. dual controller) disk storage systems.

Exemplary Fault Location Application Specific Integrated Circuit (ASIC) Subsystem Although a fault location subsystem can be implemented in any suitable hardware, software, firmware, or combination thereof, it has been found particularly advantageous to implement the fault location subsystem as an "in circuit" ASIC. ASICs are a desirable implementation choice because in standard disk storage systems, ASICs are already utilized to perform low level board-to-board functions. Accordingly, ASICs constitute a logical choice to insert the described fault detection circuitry.

Figure 6:
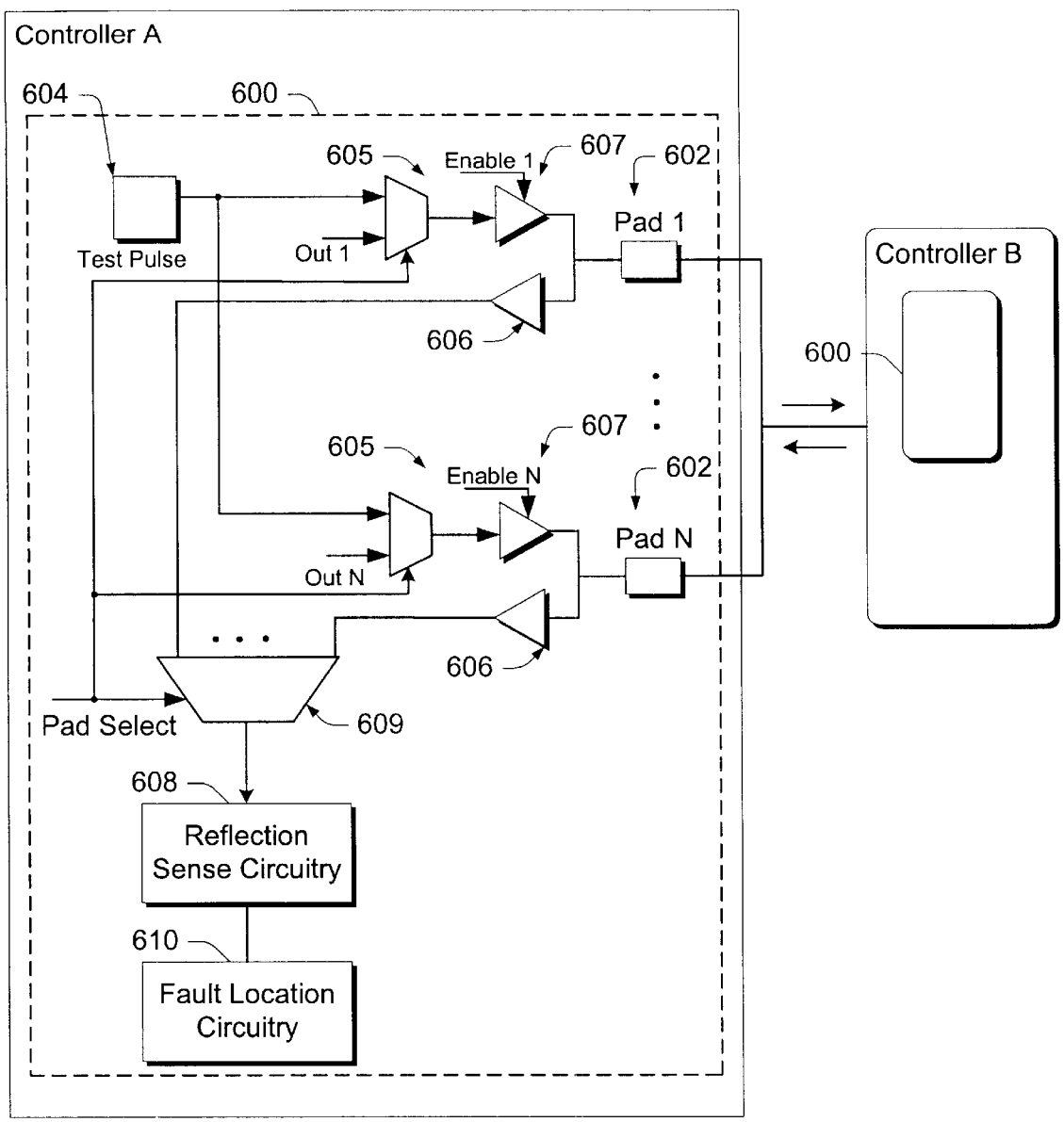
FIG. 6 is a block diagram of an exemplary implementation in the form of an application specific integrated circuit (ASIC).

FIG. 6 shows an exemplary ASIC 600 that can be used to implement the fault location subsystem. It will be appreciated that the described ASIC constitutes but one way of implementing a suitable fault location subsystem. Accordingly, other ASICs and circuits can be used without departing from the spirit and scope of the invention. In the described example, each of dual controllers A and B is embodied with an ASIC 600. In this particular example, the ASIC can comprise part of the system's normal data path ASIC.

ASIC 600 includes one or more input/output pad(s) (I/O) 602 that is (are) operably connected with the transmission lines that connect the controllers together. In this particular example, multiple input/output pads are provided and can comprise any I/O that leaves the controller. A wave-producing circuit element 604 is provided. In this example, the wave-producing circuit element includes shared wave/pulse generating logic, and separate test-enabling circuitry 605 for each pad. The test-enabling circuitry 605 includes, in this example, a multiplexer that is controllable to selectively, sequentially enable pads 602 to be tested, and a circuit element 607 that includes two inputs-an enable line and an input that is tied to the output of the multiplexer. The multiplexer includes inputs from the test pulse source, an "Out" line which is the output from the normal data path function of the IC, and a "Pad Select" line which selects a pad that is to be the subject of a test. Each of the pads 602 are operably connected with reflection sense circuitry 608 through a buffer 606 and a multiplexer 609 as shown.

The use of the illustrated multiplexers in the test-enabling circuitry 605 is advantageous in that it allows just one version of the test circuitry or system to serially, sequentially step through each pad 602 or line.

In the described embodiment, the test-enabling circuitry first selects a line to be tested. Signals are then driven and received through the associated I/O pad 602. Wave-producing circuit element 604 launches a wave onto the passive transmission line through the I/O pad 602. Immediately following the launching of the wave, the I/O pad is tri-stated and can thus receive the wave reflections from the wave that has just been launched. By analyzing the reflections, the distance to a fault can be determined. Once the distance is known, firmware executing on the controller can ascertain which component is affected by the fault. Once one line or pad has been tested, the test-enabling circuitry can then de-select the line just tested, and select the next line or pad to be tested.

In the specifically illustrated example, the ASIC can be used in the following way. Initially, a pad 602 is selected via the "Pad Select" line and is held to a logic low level. The transmission line will eventually be completely driven to this logic level as well as all points along the transmission line. The process of fault location begins by holding the "Out" signal to a logic low value and activating the "Enable" signal for an amount of time that it takes to settle the transmission line. Subsequently, the "Out" signal is driven to a logic high value. Shortly after this, the "Enable" signal is driven to an inactive state.

The manipulations of the "Out" and "Enable" signals described above cause a wave to be launched down the transmission line. This wave will propagate down the transmission line until it encounters a discontinuity created by a fault condition (i.e. an open or short condition). The wave will then be reflected back toward pad 602. The amount of time that is required for the wave to propagate toward the fault and then reflect back to pad 602 is directly correlated with the distance to the fault location. When the reflected wave is received at pad 602, reflection sense circuitry 608 determines the amount of time that it took the wave to be reflected. Any suitable circuit can be used to implement the reflection sense circuitry. For example, a high speed counter can be started when the wave is initially rendered onto the transmission line and stopped when the reflected wave is sensed at pad 602. Sensing of the reflected wave can be performed by any suitable sensor that is capable of sensing the reflected wave.

Once the amount of time is ascertained by reflection sense circuitry 608, fault location circuitry 610 uses the ascertained time to ascertain location of the fault and identity of a component that is affected by the fault. The circuitry can perform the above analysis for each of the pads on the controller by selecting the different pads through the "Pad Select" line. This enables the system to make assumptions concerning the location of the fault and hence, the faulty component. Based on these assumptions, operation can be continued with certain modifications (such as excluding an errant controller). Thus, operational integrity can be maintained and specific information can be used to direct service personnel to the faulty component. This greatly improves over past methods which had no way of ascertaining the location of a particular fault.

One of the advantages of the above described embodiment is that the test system can be embodied in a normal data path ASIC. Additionally, the configuration of the test system enables one version of the test system to be used to serially, sequentially test each of a potentially large number of pads or lines. This, in turn, minimizes the test logic that is necessary to test an entire system.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A fault-detection application specific integrated circuit (ASIC) comprising:
    wave-generating circuit means configured to generate a wave that can be propagated along a transmission line along which information or data is transmitted; and
    reflection-sensing circuit means configured to receive a wave that has been reflected because of a fault encountered by the generated wave and determine a propagation time associated with the reflected wave,
    wherein the ASIC comprises a data path ASIC.

2. The fault detection application specific integrated circuit (ASIC) of claim 1 further comprising input/output (I/O) means operably connected with the transmission line and through which the wave gets propagated.

3. The fault detection application specific integrated circuit (ASIC) of claim 1 embodied in one or more controllers configured for use in a dual controller disk storage system.

4. The fault detection application specific integrated circuit (ASIC) of claim 1, wherein the wave-generating circuit means comprises a pair of signal lines that are configured for use in generating the wave.

5. The fault detection application specific integrated circuit (ASIC) of claim 4, wherein the pair of signal lines comprise:
a first line configured as an enable line; and
a second line that can be placed in both logic low and logic high states, the wave-generating circuit means being configured to generate a wave by:
placing the second line at one of the logic low or logic high states;
enabling the enable line;
placing the second line at the other of the logic low or logic high states after said enabling; and
disabling the enable line.

6. The fault detection application specific integrated circuit (ASIC) of claim 1 further comprising fault-location circuit means in communication with the reflection-sensing circuit means and configured to ascertain the location of a fault based upon the propagation time that is determined by the reflection-sensing circuit means.

7. A fault-detection application specific integrated circuit (ASIC) comprising:
wave-producing circuitry configured to produce a wave for propagation along one of a number of transmission lines along which information or data is transmitted;
test-enabling circuitry coupled with the wave-producing circuitry and to each of the number of transmission lines, the test-enabling circuitry being configured to allow the transmissions lines to be serially, sequentially tested with a wave produced by the wave-producing circuit;
reflection-sensing circuitry coupled with the transmission lines and configured to receive a wave that has been reflected because of a fault encountered by a wave and determine a propagation time associated with the reflected wave; and
fault-location circuitry coupled with the reflection-sensing circuitry and configured to ascertain the location of a fault based upon the propagation time that is determined by the reflection-sensing circuitry.

8. The fault-detection application specific integrated circuit (ASIC) of claim 7, wherein the test-enabling circuitry comprises a multiplexer coupled with each transmission line and controllable to selectively enable each individual transmission line to be tested.

9. The fault-detection application specific integrated circuit (ASIC) of claim 7, embodied as a data path ASIC.

10. A fault location system comprising:
multiple controllers configured to produce and transmit data;
connection media communicatively linking the multiple controllers with one another;
each of the controllers comprising:
at least one wave propagator configured to generate a wave that can be propagated along the connection media toward another of the controllers;
at least one wave reflection sensor configured to sense a propagated wave that has been reflected because of encountering a fault in its propagation path; and
at least one fault locator configured to ascertain the location of a fault based upon the reflected wave that is sensed by the one wave reflection sensor.

11. The fault location system of claim 10, wherein the multiple controllers are respectively embodied as individual controllers configured for use in a mirrored memory redundant controller disk storage system.

12. The fault location system of claim 10, wherein the wave propagator, wave reflection sensor, and fault locator are embodied as an application specific integrated circuit (ASIC).

13. The fault location system of claim 12, wherein the multiple controllers are respectively embodied as individual controllers configured for use in a mirrored memory dual controller disk storage system.

14. A fault location method comprising:
launching a wave along a transmission line that is configured to carry data;
receiving a reflected wave that is reflected by a fault that is encountered by the launched wave in its propagation path;
determining an amount of time that is associated with the time between launching the wave and receiving the reflected wave;
ascertaining from the amount of time, a location of the fault that was encountered by the launched wave; and
ascertaining from the fault location which of a number of different components is affected by the fault.

15. The fault location method of claim 14, wherein said launching comprises serially, sequentially selecting each of a number of transmission lines for testing and separately launching a wave along each of the selected transmission lines.

16. The fault location method of claim 15, wherein said serially, sequentially selecting is performed by separate multiplexers that are each coupled with a different transmission line and controllable to select an associated transmission line.

17. The fault location method of claim 14 further comprising determining which of the number of different components should continue operation based upon the component that was ascertained to be affected by the fault.

18. One or more controllers configured for use in a dual controller mirrored memory computer disk storage control system, each of which being configured to implement the method of claim 14.

19. One or more application specific integrated circuits (ASICs) that are configured to implement the method of claim 14.

20. One or more controllers, each of which contain an application specific integrated circuit (ASIC) that is configured to implement the method of claim 14.

* * * * *